United States Patent
Thomsen

(10) Patent No.: US 9,908,258 B2
(45) Date of Patent: Mar. 6, 2018

(54) CHAIN SAW CHAIN CONTAINMENT DEVICE

(71) Applicant: Kenneth J. Thomsen, Olympia, WA (US)

(72) Inventor: Kenneth J. Thomsen, Olympia, WA (US)

( * ) Notice: Subject to any disclaimer, the term of this patent is extended or adjusted under 35 U.S.C. 154(b) by 410 days.

(21) Appl. No.: 13/999,957

(22) Filed: Apr. 9, 2014

(65) Prior Publication Data

US 2014/0305273 A1 Oct. 16, 2014

Related U.S. Application Data

(60) Provisional application No. 61/853,717, filed on Apr. 10, 2013.

(51) Int. Cl.
*B27G 19/00* (2006.01)
*A01G 23/091* (2006.01)

(52) U.S. Cl.
CPC ......... *B27G 19/003* (2013.01); *A01G 23/091* (2013.01); *Y10T 29/49716* (2015.01); *Y10T 83/7226* (2015.04)

(58) Field of Classification Search
CPC ....... B27B 17/00; B27B 17/083; A01G 23/02; A01G 23/091; B27G 19/003
USPC ...... 83/788–820, 830–834; 30/386; 144/34.1
See application file for complete search history.

(56) References Cited

U.S. PATENT DOCUMENTS

| | | | | |
|---|---|---|---|---|
| 3,612,115 A | * | 10/1971 | Albright | ............. B27B 17/0091 144/34.1 |
| 4,315,370 A | | 2/1982 | Horne | |
| 4,805,308 A | | 2/1989 | Ritola | |
| 5,101,567 A | | 4/1992 | Cool | |
| 5,709,254 A | * | 1/1998 | Argue | .................. A01G 23/091 144/336 |
| 6,032,373 A | * | 3/2000 | Peterson | ................. B27B 17/08 30/383 |
| 7,287,330 B1 | * | 10/2007 | Riha | ........................ B27B 17/14 30/381 |
| 7,690,407 B2 | | 4/2010 | Annala | |
| 2006/0107804 A1 | * | 5/2006 | Annala | ................. A01G 23/091 83/13 |

* cited by examiner

*Primary Examiner* — Kenneth E. Peterson
*Assistant Examiner* — Samuel A Davies
(74) *Attorney, Agent, or Firm* — Brian J. Coyne

(57) ABSTRACT

A device for deflecting a detached cutting chain off the drive sprocket of a chain saw in order to deenergize and arrest it. A ramp provides a surface disposed below the chain guide bar, which surface is oblique with respect to the chain guide bar, slightly below a lower edge of the chain guide bar and obliquely angled with respect to a plane that contains the exterior surface of the chain guide bar, and distal to the drive sprocket. Sliding engagement of a detached cutting chain with the oblique surface moves the cutting chain exteriorly away from the chain guide bar and off the drive sprocket. A chain catcher is also provided to arrest the detached cutting chain and/or chain shot portions thereof.

18 Claims, 13 Drawing Sheets

CHAIN SAW CHAIN CONTAINMENT DEVICE

CROSS-REFERENCE TO RELATED PATENT APPLICATIONS

This application claims the benefit of U.S. provisional application No. 61/853,717 for the same invention, entitled "Chain saw chain containment device," filed on Apr. 10, 2013, by the same inventor, the disclosure of which is incorporated herein.

STATEMENT REGARDING FEDERALLY APPROVED RESEARCH OR DEVELOPMENT

None.

BACKGROUND OF THE INVENTION

1. Field of the Invention

This invention relates generally to power chain saws and, more particularly, to safety devices for catching and containing a cutting chain that has become detached from the chain bar during operation of the saw. More specifically, the present invention pertains to a device for removing from the chain saw drive sprocket a cutting chain that has become detached from the chain bar during operation of the chain saw portion of a forest harvester to thereby deenergize the cutting chain, contain it, and render it harmless.

2. Background Art

Chain shot—i.e., flying fragments of a broken cutting chain of a power chain saw, as depicted, for example, in FIG. 1—can be caused by improper chain tension, maintenance or repair, a damaged chain drive sprocket, chain guide bar and/or cutting chain, improper chain guide bar and chain lubrication, or excessive chain speed. Chain shot moves at high speed, usually in the plane of the chain bar and forwardly or rearwardly from the saw, and is an ever present danger to nearby personnel during operation of a power chain saw. In the case of a forest harvester, there is a direct hazard to the operator in the harvester cab when the chain bar is pointing toward the cab because chain shot has been known to penetrate the cab window under those circumstances and strike the operator within the cab.

One approach to reducing the hazard presented by a broken cutting chain has been to deenergize and/or impose restrictions on the movement of broken chain ends and chain fragments. U.S. Pat. No. 5,101,567 issued to Cool disclosed a safety switch that deenergized the chain drive of a hand-held chain saw in the event of a break in the cutting chain, and also disclosed a chain braking mechanism and safety guard to effect stoppage of the cutting chain motion. U.S. Pat. No. 4,805,308 issued to Ritola disclosed a roller attachment to the handle of a hand-held chain saw. The roller was aligned with the chain guide bar so as to extend substantially perpendicularly through the plane defined by the chain guide bar in order to intercept the saw chain should it become derailed. U.S. Pat. No. 4,315,370 issued to Horne disclosed a finger piece that acted as a safety surface in the event of breakage of the cutting chain on a hand-held chain saw. The finger piece was located far enough forward from the chain drive to force the whipping length of the chain to pivot and catch the broken chain.

The present invention, however, is primarily directed to improving the safety of chain saws mounted on forest harvesters, which are used in the commercial timber industry for felling and cutting the trunk of trees at suitable intervals. The present invention is particularly directed to deenergizing and restraining the cutting chain of a harvester-mounted chain saw when the cutting chain has become derailed—that is, detached from the chain guide bar and chain drive sprocket of the chain saw; see FIG. 3. In such a harvester chain saw, the cutting chain is looped around a drive sprocket and chain guide bar, similar to a hand-held chain saw, but, unlike a hand-held chain saw, which is typically powered by an internal combustion engine or electric motor, to achieve high-powered, rapid cutting, the drive sprocket is mounted to the output shaft of a hydraulic motor, and the chain saw itself is mounted for pivotal rotation about the motor shaft axis by a hydraulic cylinder within a shielding saw casing or saw box—all under the control of an operator seated within the cab of the harvester. The shielding provided by the saw box is only partial, of course, because the saw box must be sufficiently open to permit sawdust generated during cutting to exit the box, for maintenance access, and for the chain saw to pivot in and out of the box.

For such a harvester-mounted chain saw, U.S. Pat. No. 7,690,407 B2 issued to Annala disclosed a protective wall positioned in the vicinity of the chain drive sprocket that was capable of receiving the movement of the tail of the broken cutting chain with the intent of guiding the broken chain in a desired direction. Annala's protective wall, depicted and labelled as "chain shot guard" in FIG. 2, was perhaps the most common device in use on harvester-mounted chain saws to intercept and restrain a broken cutting chain prior to my present invention. A chain shot guard has commonly been accompanied by a chain catcher, also illustrated in FIG. 2, in the form of a short, cylindrical extension attached to, and coaxially aligned with, the hydraulic motor shaft, and intended to intercept and receive in winding engagement a broken tail portion of a cutting chain. In an alternate version, the chain catcher has been bobbin-shaped, as depicted, for instance, in FIG. 4. In either case, the chain catcher of the prior art extended coaxially from, and rotated with, the hydraulic motor shaft. In extensive testing, I have observed that is counterproductive because, after a cutting chain broke or derailed, at the very time the cutting chain needed to be deenergized, the ongoing rotation of the chain catcher continued to add rotational energy to the broken tail of the cutting chain. In the case of a derailed cutting chain, the usual result was that the cutting chain would break up into three segments, creating chain shot instead of eliminating it.

SUMMARY OF THE INVENTION

There thus remains a need for a device to deflect a cutting chain that has detached from the chain guide bar of a chain saw away from the chain guide bar and off the drive sprocket in order to deenergize the cutting chain and arrest it without releasing any chain shot into the environment. It is therefore an object of the invention to incorporate into a chain saw, and particularly a forest harvester-mounted chain saw, a chain containment device that comprises deflector means for deflecting, during operation of the chain saw, a detached or broken cutting chain exteriorly away from the chain saw drive sprocket in order to deenergize the cutting chain, as well as chain catcher means for catching and arresting the detached cutting chain after it has been deflected off the drive sprocket. The deflector means provides a ramp surface disposed below a lower edge of the chain guide bar, distal to the drive sprocket, and crossing a plane that contains the chain bar guide from a distal, entrance surface disposed slightly interior to the interior surface of the chain guide bar to a proximal exit, surface that is exterior to a plane that contains the exterior surface of the chain guide bar. That is, the deflector means includes ramp means having an exterior surface that extends proximally and exteriorly at an oblique angle with respect to the plane that contains the exterior surface of chain guide bar. The deflector means further includes means for attaching the ramp means to the chain saw. The chain catcher is mounted to the chain saw and spaced apart exteriorly from the proximal ring of the chain bar mount.

In a first embodiment of the device, the means for attaching the ramp means to the chain saw includes a first face plate that is shaped and dimensioned for attachment by fasteners to an exterior surface of the saw chain tensioner of the chain saw. An upper portion of a semiannular arm is attached to an upper, proximal end of the first face plate, which arm has a ramp extension that extends distally below and adjacent to a lower edge of the chain guide bar. The ramp extension has an exterior surface that extends proximally and exteriorly at an oblique angle with respect to the plane that contains the exterior surface of the chain guide bar. The semiannular arm is shaped and dimensioned for coaxial, surrounding engagement of the proximal ring of the chain bar mount. Accordingly, the semiannular arm, the drive sprocket, and the drive shaft of the motor that powers the chain saw all share a common axis A-A that is normal to a plane that contains the chain guide bar. The chain catcher means of the first embodiment of the device includes a flange at a proximal end of the first face plate, which flange protrudes exteriorly from the first face plate and extends from an upper edge to a lower edge of the first face plate. Optionally, the chain catcher means can include a second flange that protrudes exteriorly from an upper edge of the first face plate as well. In addition, an upper portion of the semiannular arm also acts to catch a detached or broken cutting chain and can, therefore, be considered as part of the chain catcher means.

In a second embodiment of the device, the ramp means can include a horseshoe-shaped arm with a semiannular bight portion. The bight portion is shaped and dimensioned for coaxial, surrounding engagement of the ring of the bar mount. The second embodiment further includes a ramp that extends proximally from a lower, distal end portion of the horseshoe-shaped arm below the chain guide bar, and slightly interior (e.g., 1 cm) to a plane that contains the interior surface of the chain guide bar. The ramp has an exterior surface that extends proximally and exteriorly at an oblique angle with respect to the plane that contains the chain guide bar. Similar to an actual horseshoe, and except for its ramp, the thickness of the horseshoe-shaped arm preferably is more or less uniform throughout. A preferred means for attaching the horseshoe-shaped arm is a weld between a lower portion of the arm and the ring portion of the bar mount. The horseshoe-shaped arm enlarges the available surface area for attaching a ramp in the required location and may not be necessary on all chain saws.

The chain catcher means of the second embodiment of the device includes a guard that is semiannular in exterior elevational view and is exteriorly spaced apart from the drive sprocket, and a chain catcher mounting plate that is shaped and dimensioned for close-fitting attachment by threaded fasteners to an exterior surface of the saw chain tensioner. A proximal end of the chain catcher mounting plate is attached to the distal ends of said guard. Preferably, the chain catcher mounting plate is coplanar with the guard, the guard is coaxial with the drive sprocket, the guard has an outer radius greater that the outer radius of the drive sprocket, but less that the outer radius of the proximal ring of the bar mount, and the bight portion of the guard is semitoroidal—that is, the shape of the guard comprises one-half of a torus defined by a plane through the center of the torus that bisects the torus into two, equal, opposite halves.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

Like numerals denote like parts throughout the several views.

DETAILED DESCRIPTION OF THE PREFERRED EMBODIMENTS

Figure 1:
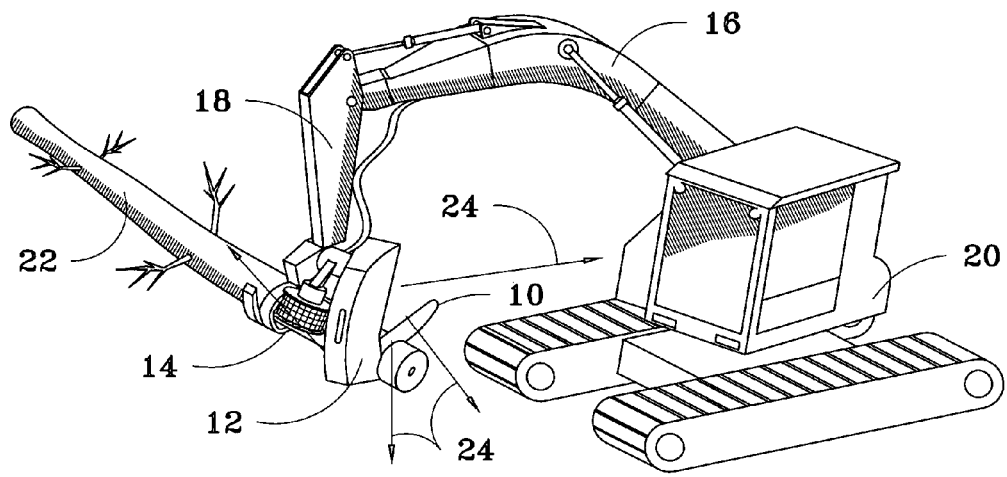
FIG. 1 depicts a chain saw carried by a dangle head suspended from the main boom and jib boom of a forest harvester and cutting through the trunk of a felled tree; the arrows indicate possible directions of travel for chain shot if the cutting chain were to break.
Figure 2:
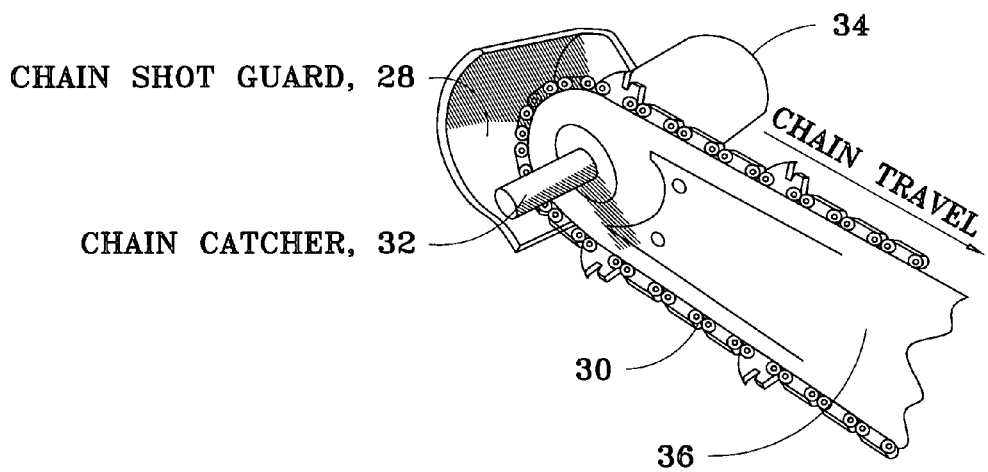
FIG. 2 is schematic, perspective view of an exterior side of a proximal end portion of the chain saw of FIG. 1, showing a chain shot guard and chain catcher of the prior art.
Figure 3:
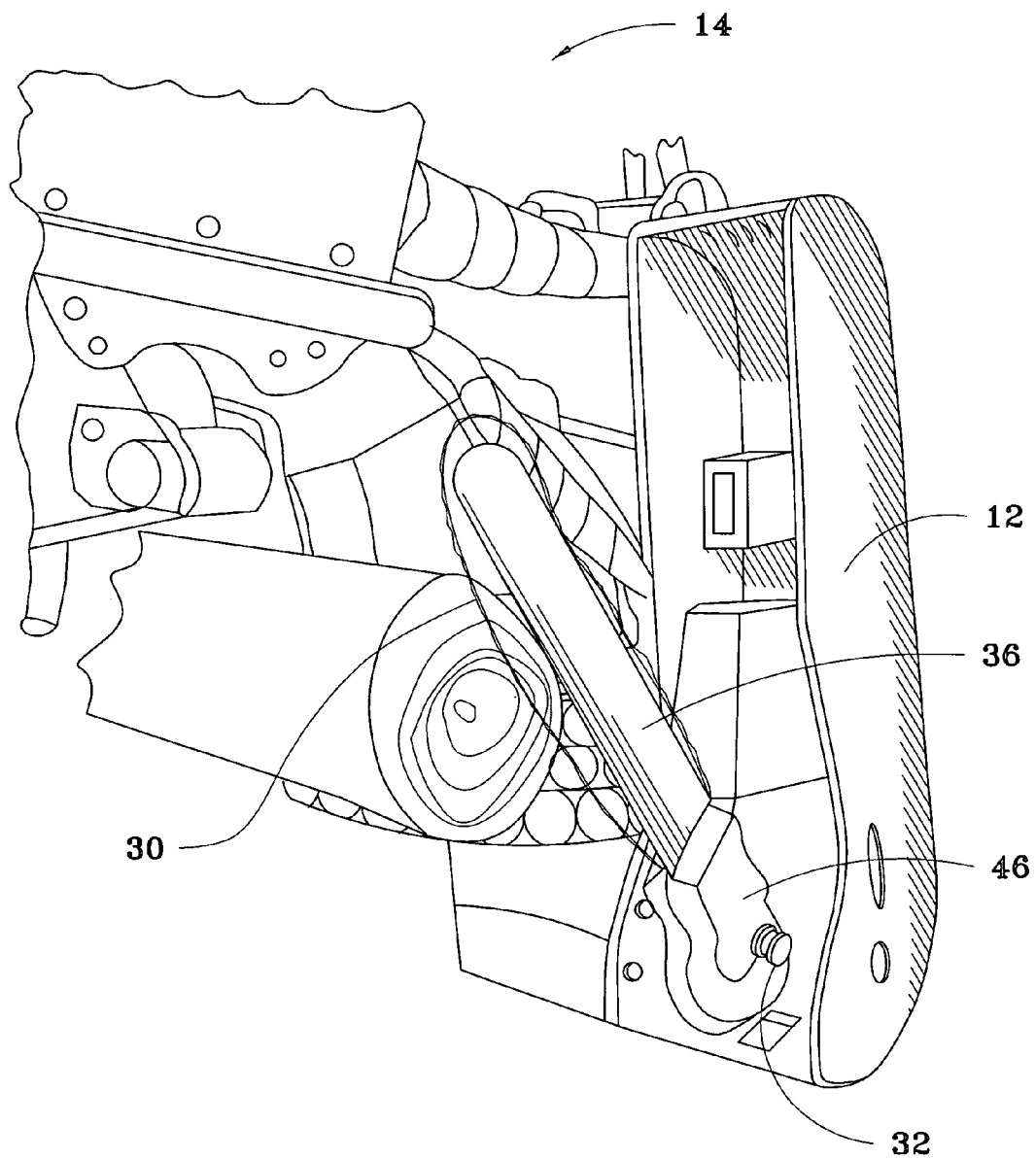
FIG. 3 is an enlarged, fragmentary, perspective view of an operating chain saw partially lowered out of a shielding saw casing carried by a dangle head; the cutting chain has become detached from the chain guide bar, a condition that, absent the installation of the present invention on the chain saw, portends impending chain shot.
Figure 4:
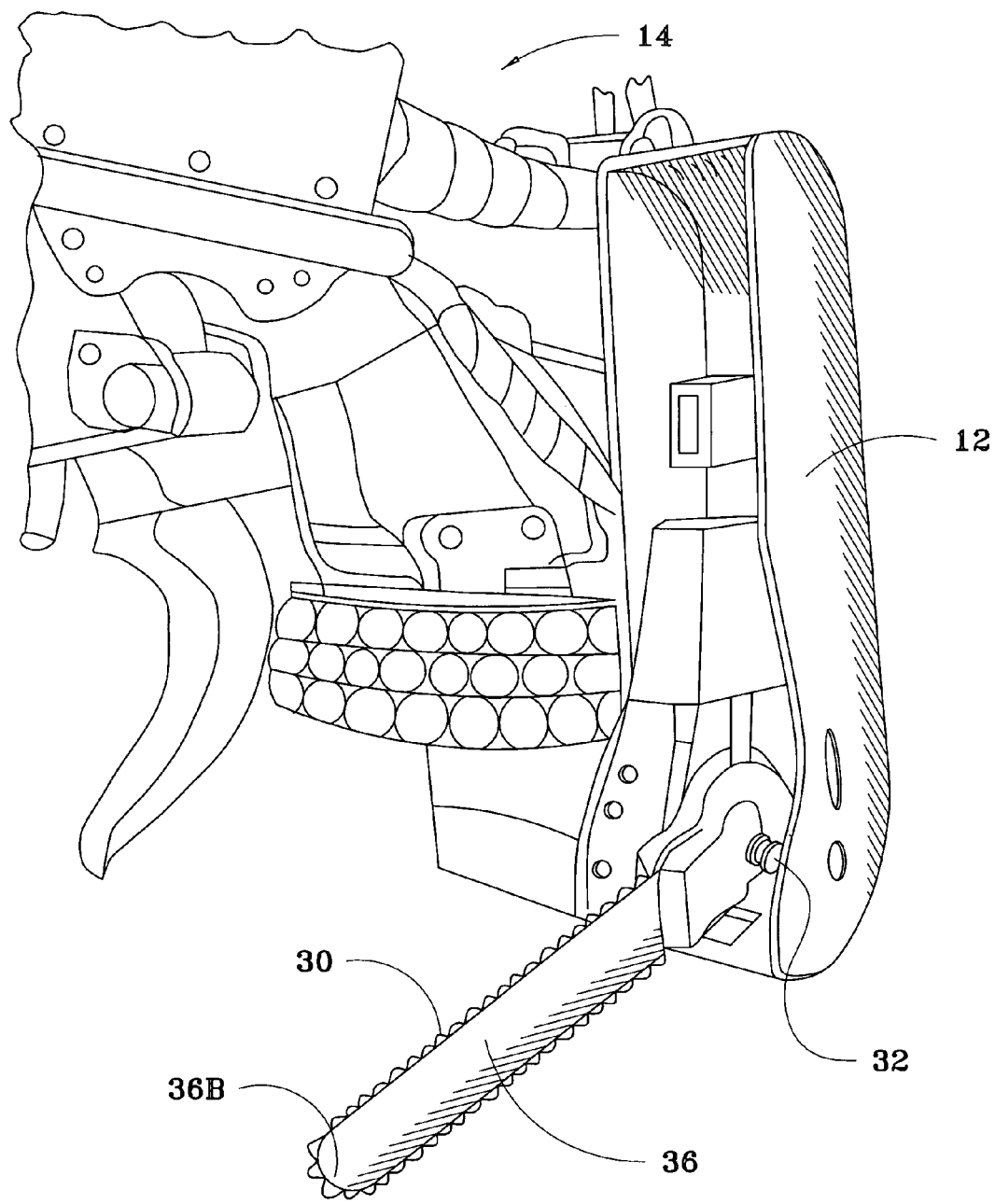
FIG. 4 repeats FIG. 3, but here the cutting chain has not detached and instead has remained within the groove of the chain guide bar, and the chain saw has been pivoted to a fully lowered position.

Referring to FIG. 1, a chain saw 10 pivotally mounted for rotation within a shielding saw casing or saw box portion 12 of a dongle head 14 suspended from the main boom 16 and jib boom 18 of a forest harvester 20 is shown cutting through the trunk of a felled tree 22. The arrows 24 indicate possible directions of travel for chain shot if the cutting chain 26 were to break. Prior to my present invention, the accepted way in the timber harvesting industry to contain chain shot has been to install on a forest harvester chain saw a chain shot guard 28 that partially surrounds a proximal end portion of the chain saw. It was intended that, should pieces of the cutting chain 30 break off, the chain shot would be captured within the convex, apposed surface of the chain shot guard. It was also common to further include a chain catcher 32, as depicted in FIG. 2, as an axial, cylindrical stub extension (or bobbin-shaped, as in FIGS. 3 and 4) of the drive shaft of the hydraulic motor assembly 34, with the intent that, if the cutting chain 30 were to become detached from the chain guide bar 36 of the chain saw (see, for example, FIG. 3), the detached cutting chain would wrap itself around the chain catcher 32 and thereby be captured. Sometimes, however, the detached cutting chain 30 broke up into chain shot instead.

Figure 6:
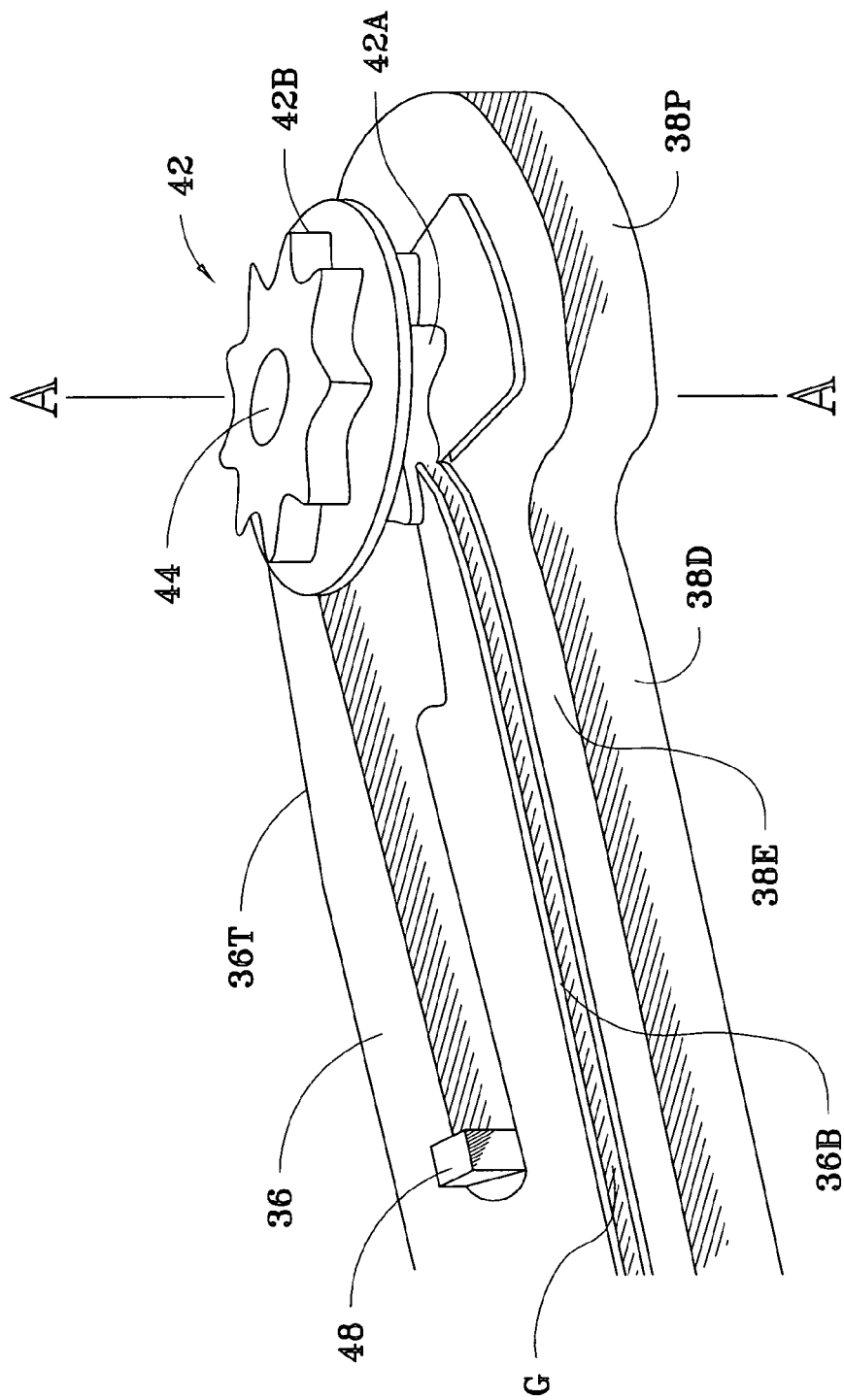
FIG. 6 is a further enlarged, perspective view of the following components of the chain saw of FIGS. 1-4 after the saw has been removed from the shielding saw casing and has been partially disassembled: the chain bar mount; a proximal portion of the chain guide bar positioned adjacent to an exterior surface of the chain bar mount; and the drive sprocket disposed at an exterior side of the proximal ring portion of the chain bar mount and aligned for rotation about the motor drive shaft axis (A-A). The motor assembly, which attaches to an interior side of the chain bar mount, is omitted for clarity.

The present invention dispenses with the chain catcher 32 (FIGS. 2, 3 and 4) and chain shot guard 28 (FIG. 2) of the prior art. To illustrate how one installs a first embodiment of my chain containment device 100 on a harvester chain saw 10, selected component parts of a disassembled forest harvester chain saw of the prior art (e.g., a Keto 800 PHD Processor) are depicted in FIG. 6. Illustrated in FIG. 6 are the chain bar mount 38, which comprises a rectilinear, distal base portion 38D joined to, and coplanar with it, a proximal ring portion 38P; a proximal portion 36P of the chain guide bar 36 disposed adjacent to an exterior surface 38E of the chain bar mount 38; a drive sprocket 42 disposed at an exterior side 40 of the proximal ring portion 38P of the chain bar mount and aligned for rotation about the hydraulic motor drive shaft axis (A-A); and a closed-loop, cutting chain 30 looped around the chain guide bar and the drive sprocket. The drive sprocket 42, which attaches to the drive shaft 44 of the hydraulic motor assembly' 34, has a first set of radially-directed teeth 42A and, disposed on an opposite side of the sprocket, a coaxial second set of radially-directed teeth 42B, such that, after excessive wear on the first set of teeth, the sprocket can be removed from the drive shaft, inverted, reattached to the drive shaft, and the second set of teeth can be used thereafter to drive the cutting chain 30. The top 36T, distal end 36D, and bottom 36B edges of the chain guide bar 36 has a continuous groove G, and, when the chain saw is operating, the cutting chain 30 moves through that groove.

Figure 7:
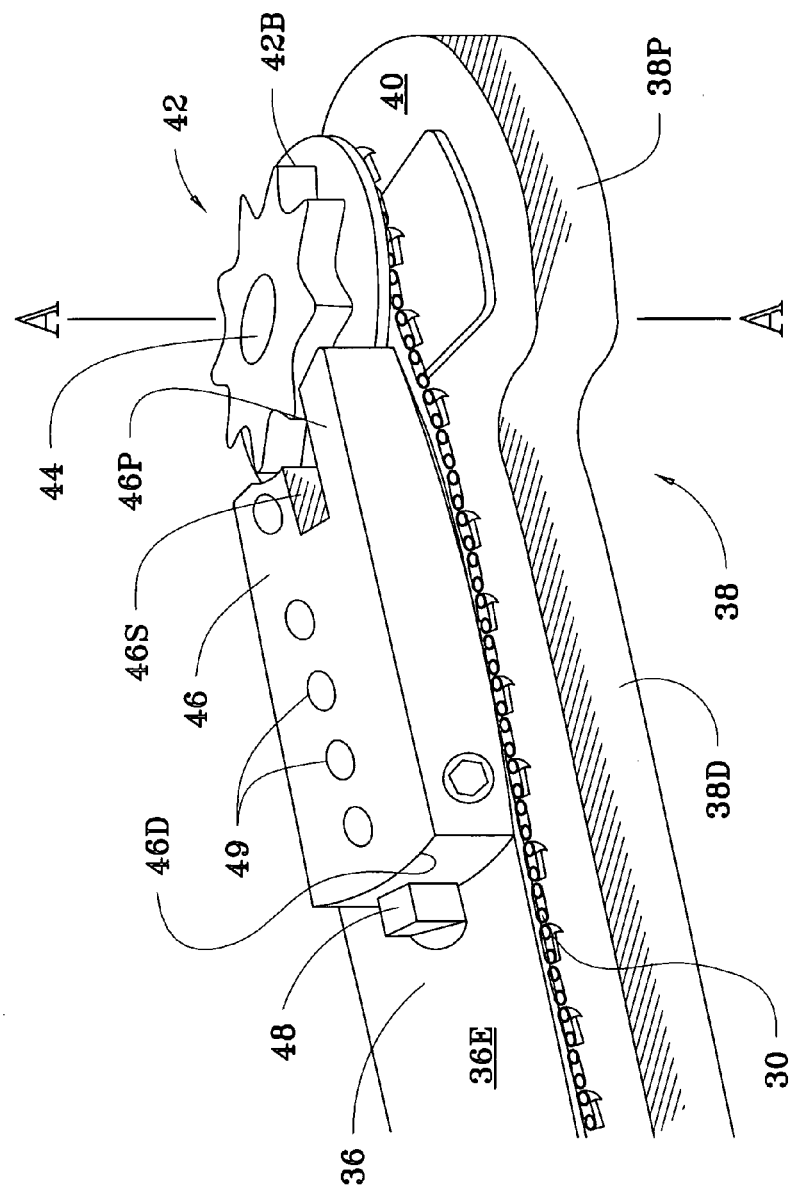
FIG. 7 repeats FIG. 6, except that the cutting chain is shown looped around the drive sprocket and the groove of the chain guide bar, and the saw chain tensioner has been placed on the exterior surface of the chain guide bar with its bolt apertures aligned in registry with corresponding threaded bolt apertures of the bar mount.
Figure 8:
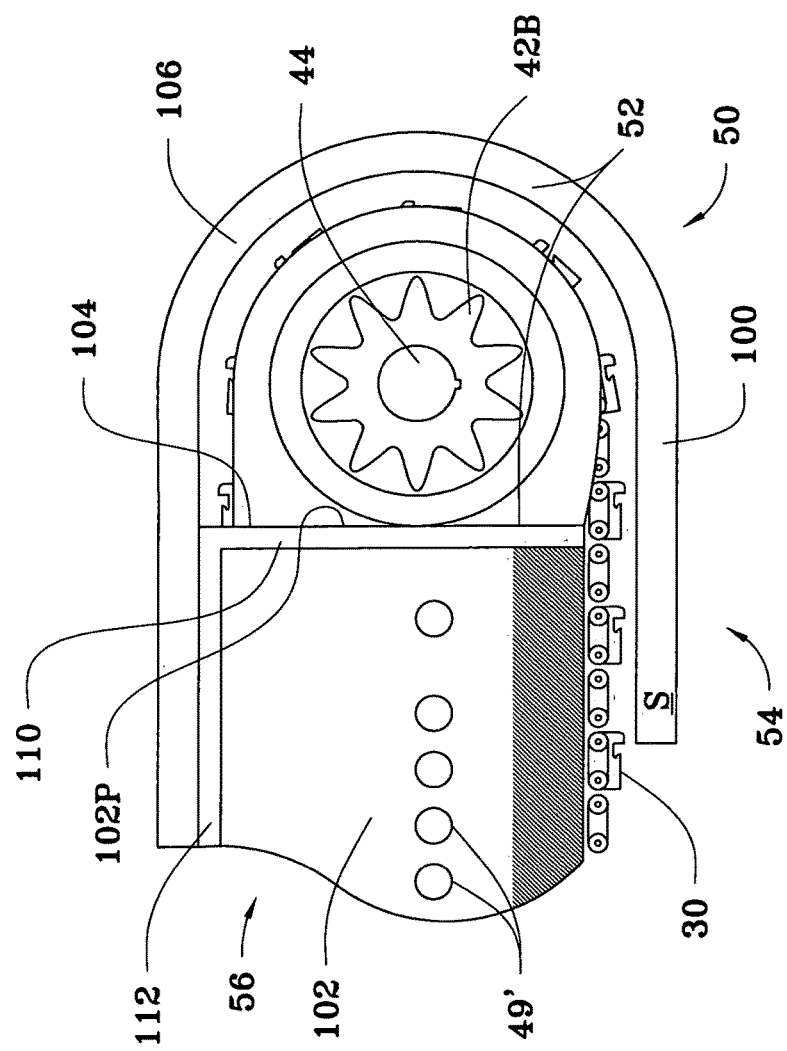
FIG. 8 is an exterior, elevational view of the partially assembled chain saw of FIG. 7, but showing a first embodiment of the chain containment device of the present invention mounted thereon, as follows: the first face plate of the device thereof is disposed adjacent to the exterior surface of the saw chain tensioner with corresponding openings for threaded fasteners of each aligned in registry; a semiannular arm of the device attached to an upper, proximal end of the first face plate and disposed in surrounding engagement around the periphery of the proximal ring portion of the mount; and a ramp extension that extends distally from a lower side of the semiannular arm to a free end.
Figure 9:
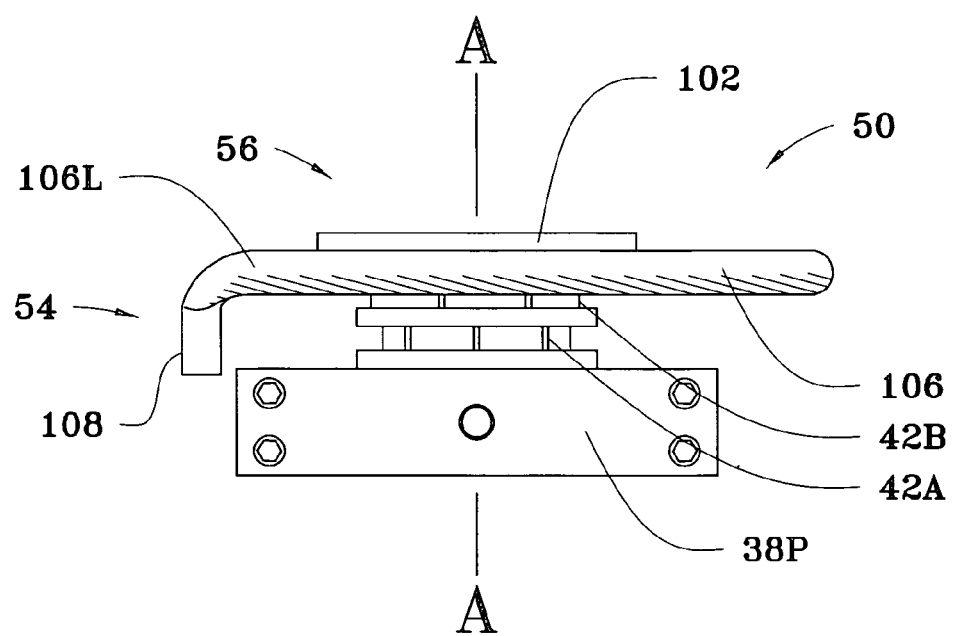
FIG. 9 is an elevational view of a proximal end thereof, with the cutting chain omitted for the sake of clarity.
Figure 10:
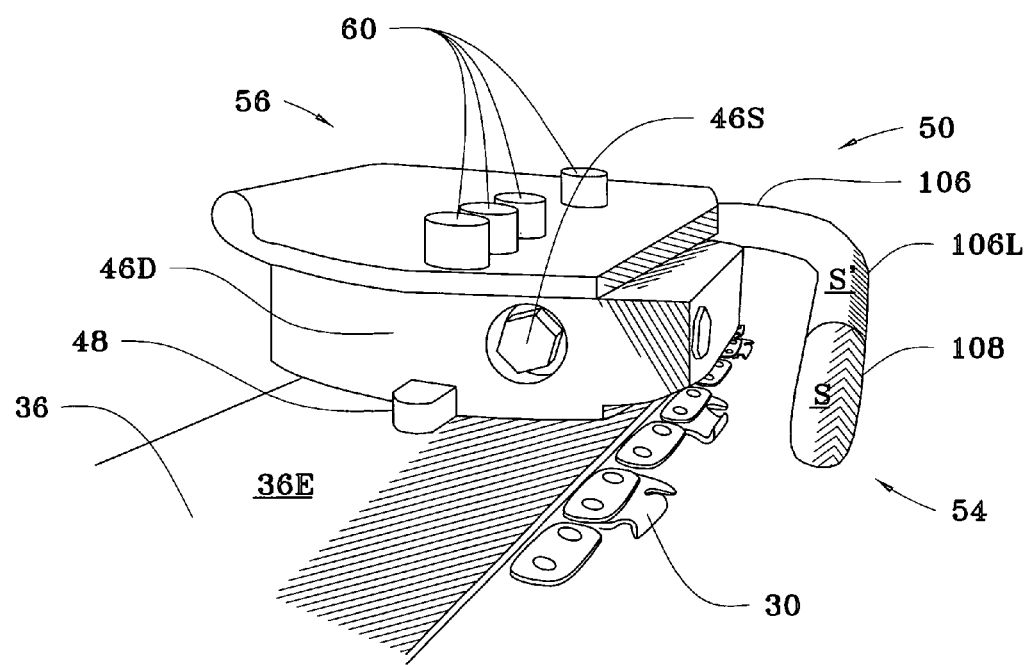
FIG. 10 is a perspective view thereof as seen distally and from below the cutting chain.
Figure 11:
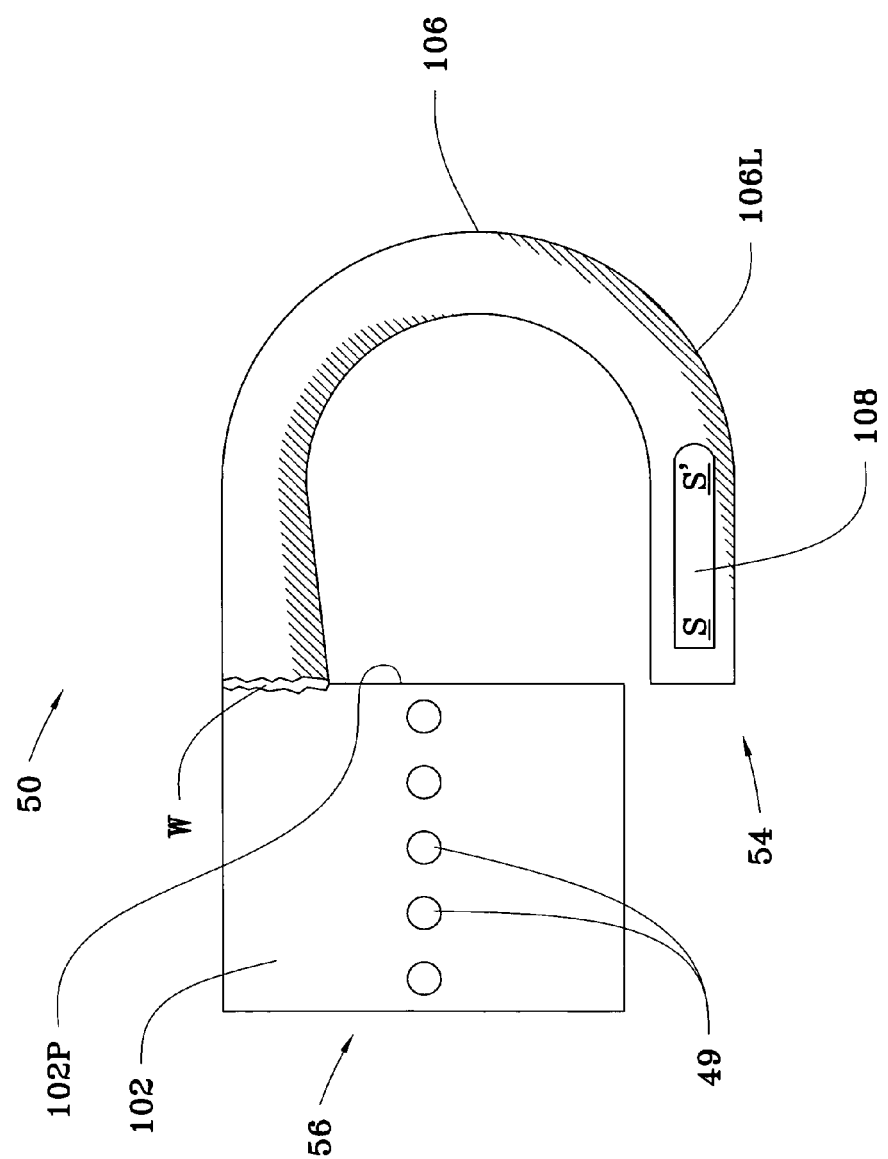
FIG. 11 is an exterior, elevational view of the first embodiment of the device, separate from the chain saw, wherein "W" indicates a weld.

In FIG. 7, the cutting chain 30 has been installed on the disassembled chain saw 10 and a saw chain tensioner 46 has been positioned at the exterior surface 40 of the bar mount 38 and distally with respect to the drive sprocket 42. The cutting chain 30 is looped around whichever of the two sets of sprocket teeth 42A, 42B, is currently flipped toward the interior side of the sprocket 42, which, in the case of FIGS. 6-9 happens to be the set that has been designated 42A, and that currently interiorly-disposed set of sprocket teeth lies within the plane of the chain guide bar 36. Thus, as it rotates around the chain guide bar 36 and the drive sprocket 42, the cutting chain 30 remains within a plane that contains the chain guide bar (whereas, the unused set of sprocket teeth 42B lies outside of, and exterior to, said plane). The proper positioning of the chain tensioner 46 is aided by a locating lug 48 that extends upward from an exterior side of the base portion of the bar mount and abuts a distal end 46D of the chain tensioner as well as by a plurality of bores 49 in the tensioner for threaded fasteners 60 that align in registry with corresponding threaded bores in the bar mount 38 when the chain saw 10 is reassembled. The chain tensioner 36 includes a chain tension adjustment screw 46S (e.g., Allen screw; FIG. 10) within a longitudinal bore (not shown) that extends through the chain tensioner from the distal end 36D thereof to a longitudinally slotted, proximal end portion 46P thereof where it threads into a mating, threaded bore of a tensioner member (not shown) that is slidable within the slot and which attaches to a proximal end portion of the chain guide bar 36, such that rotation of the screw 46S permits adjustment of the tension in the cutting chain 30.

The present invention comprises deflector means, denoted generally by the numeral 50, and chain catcher means, denoted generally by the numeral 52. The purpose of the deflector means 50 is to deflect, during operation of the chain saw 10, a detached or broken cutting chain 30 exteriorly away from the drive sprocket 42, thereby preventing the drive sprocket from imparting additional kinetic energy to the cutting chain. In the first embodiment 100, the deflector means 50 is disposed below the saw chain tensioner 46 and below the bottom edge 36B of the chain guide bar 36, such that the entrance surface S at a proximal end of the deflector means is slightly interior (e.g., 1 cm to 3 cm) to a plane that contains the interior surface of the chain guide bar. The deflector means 50 includes ramp means 54 having an exterior surface (S to S') that extends proximally and exteriorly at an oblique angle with respect to the plane that contains the exterior surface 36E of the chain guide bar 36 and thus actually crosses over the chain guide bar 36, and means 56 for attaching the ramp means to the chain saw 10.

In the first embodiment 100, the means 56 for attaching the ramp means 54 comprises a flat, first face plate 102 and a semiannular arm 106 attached to an upper, proximal end 104 of the first face plate. The first face plate 102 is apertured (openings 49'), shaped and dimensioned for attachment by threaded fasteners 60 to an exterior surface 46E of the saw chain tensioner 46, which fasteners extend through the above-described openings 49 in the chain tensioner. The semiannular arm 106 has a ramp extension 108 that extends distally from a lower portion 106L of the semiannular arm below and adjacent to the lower edge of the chain guide bar 36. The ramp extension 108 has an exterior surface S that extends proximally and exteriorly at an oblique angle with respect to the plane that contains the exterior surface 36E of the chain guide bar 36. Most detachments of a cutting chain 30 from the chain guide bar 36 are minimal deviations, temporary, and self-correcting, and we do not want the device 100 to derail the cutting chain for such minimal deviations. Accordingly, the entrance surface S is disposed at some minimal distance below the lower edge of the chain guide bar 36. That minimal distance should be greater than the overall height of the cutting chain 36 in interior, elevational view; that is, the minimal distance will ordinarily be in the range of 4 to 6 cm, more or less for a three-quarter pitch cutting chain. The optimal minimum distance will vary somewhat among chain saws and with the design and dimensions of their cutting chains. In any case, the optimal minimum distance must be experimentally determined for each chain saw to prevent unnecessary derailings of the cutting chain 30.

The semiannular arm 106 coaxially surrounds and engages the semiannular periphery of the proximal ring 38P of the chain bar mount. In the event that the cutting chain 30 detaches from the groove G of the chain guide bar 36 during operation of the chain saw 10, the cutting chain would slide exteriorly along the oblique surface S to the exit surface S' of the ramp extension 108, which is preferably disposed well exteriorly from the drive sprocket 42; the inevitable result is that the cutting chain is thereby removed from the drive sprocket 42, loses kinetic energy, and slows to a stop while still contained within the chain saw box 12.

In the first embodiment 100, the chain catcher means 52 comprises a flange 110 at a proximal end portion 102P of the first face plate 102. The flange 110 extends from an upper edge to a lower edge of the first face plate 102 and protrudes exteriorly therefrom enough to be an effective barrier against a detached or broken chain flying distally past its location during operation of the chain saw 10. In addition, an upper portion of the semiannular arm 106 also helps catch a detached or broken piece of cutting chain 30. Accordingly, if any portion of a detached cutting chain 30 moves from the semiannular arm 106 in the distal direction past the drive sprocket 42 it will hit the flange 110 and be stopped. Preferably, the face plate has a second flange 112 that is similar in shape and dimension to the flange 110, but is disposed along an upper edge of the first face plate 102P to further confine the movement of a detached chain or chain shot.

Figure 12:
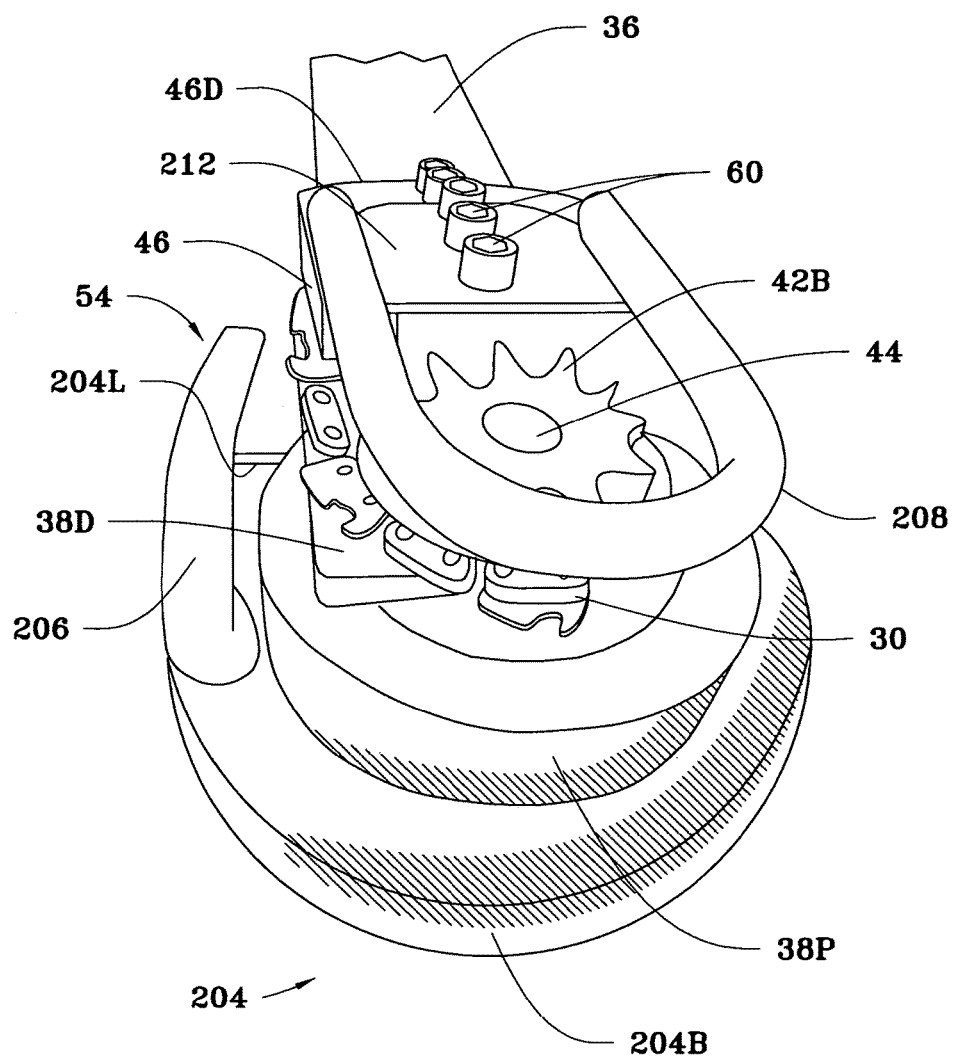
FIG. 12 is a perspective view of a proximal end portion of the chain saw of FIG. 7, with a second embodiment of the chain containment device of the present invention mounted thereon.
Figure 13:
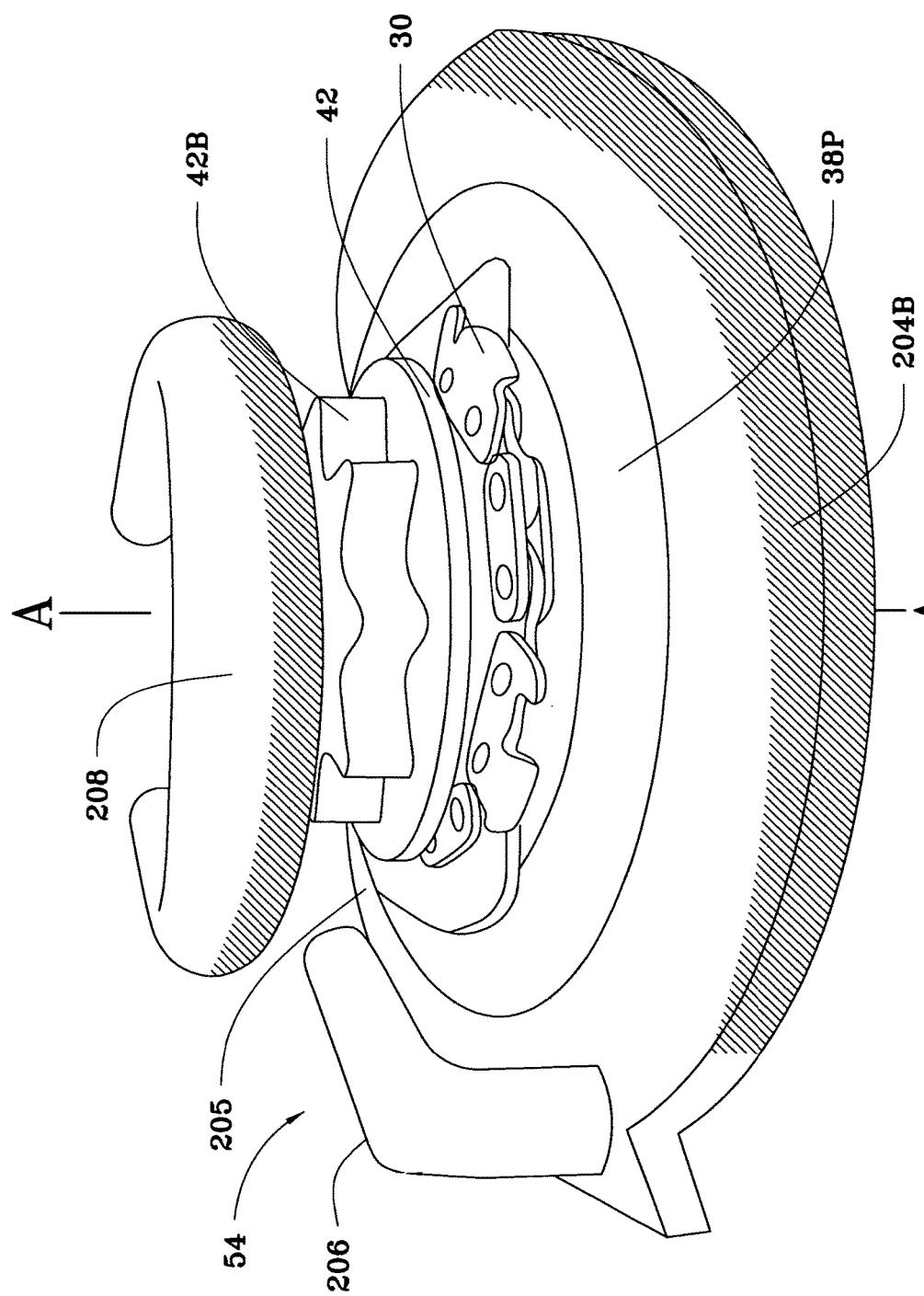
FIG. 13 is a perspective view thereof as seen from the exterior side of the chain saw.
Figure 14:
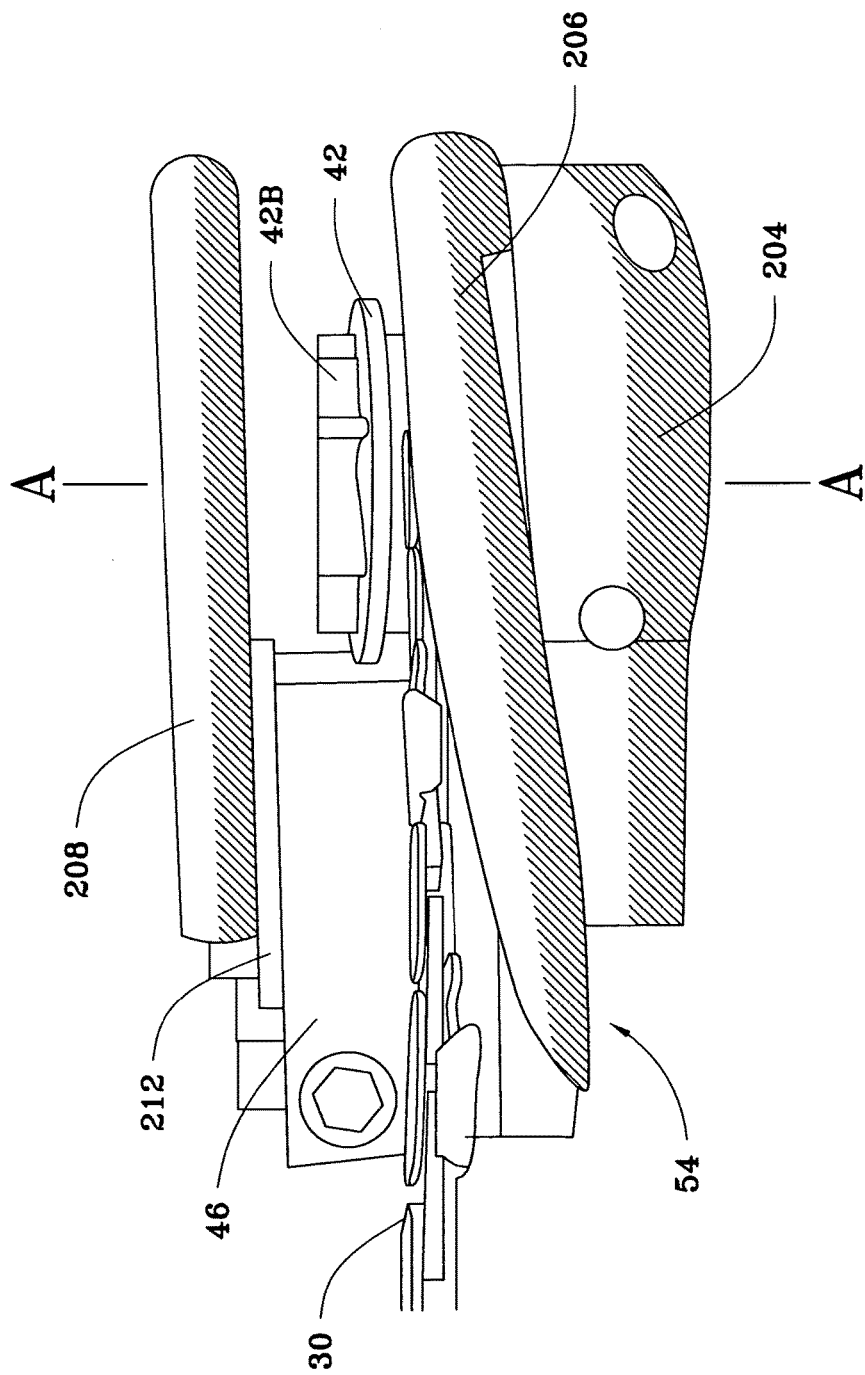
FIG. 14 is a bottom plan view thereof.

A second embodiment of the device 200 is depicted in FIGS. 12-14. In the device 200, for ramp means 54 there is provided a horseshoe-shaped arm 204 that includes a bight portion 204B. The bight portion 204B is dimensioned for coaxial, coplanar, close-fitting, surrounding engagement of the proximal ring portion 38P of the bar mount 38. The ramp means 54 further includes a ramp 206 that extends proximally and exteriorly from (or near) the lower, distal end 204L of the arm 204. The ramp 206 is disposed below the chain guide bar 36, and has an entrance surface slightly interior to a plane that contains the interior surface of the chain guide bar (e.g., 1 cm to 3 cm) and an exit surface that is exterior to the chain guide bar—that is, the ramp crosses over the chain guide bar 36. With the ramp 206 so positioned, if, during operation of the chain saw 10, the cutting chain 30 becomes detached from the groove G, the cutting chain will swell into a more circular configuration and will be deflected off and exteriorly away from the drive sprocket 42, depriving the cutting chain of additional kinetic energy. Previous comments regarding the minimum and maximum distances between the exterior surface of the chain guide bar 36 and the ramp extension 108 of the first embodiment of the device 100 apply as well to the ramp 206 of the second embodiment 200. Preferably, the arm 204 is attached to a lower, ring portion of the bar mount by a weld or other suitable means.

For chain catcher means 52, the second embodiment of the device 200 provides a guard 208 that is semiannular in exterior elevational view and is exteriorly spaced apart from the drive sprocket 42. The chain catcher means 52 of the second embodiment 200 further includes a chain catcher mounting plate 212 that is shaped and dimensioned for close-fitting attachment by fasteners to an exterior surface of the chain tensioner 46. Preferably, the guard 208 is coaxial with the drive sprocket 42, is semitoroidal as depicted in FIGS. 12-14, and has an outer radius greater that the outer radius of the drive sprocket, but less that the outer radius of the proximal ring 38P of the bar mount 38.

Figure 5A:
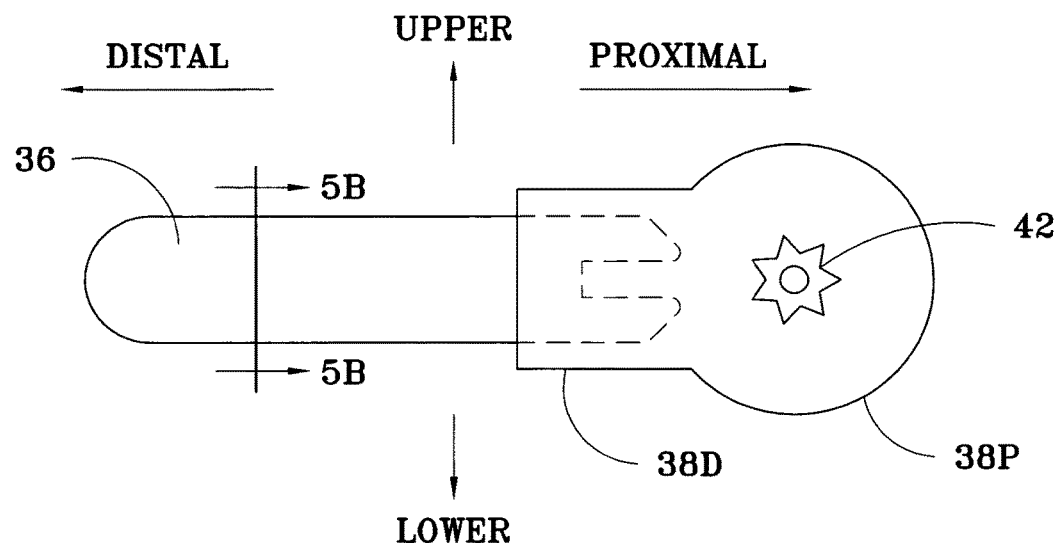
FIG. 5A is an exterior, elevational schematic view of the chain guide bar, bar mount, and drive sprocket of the chain saw of FIGS. 1-4, showing the meaning of the terms "distal," "proximal," "upper," and "lower" as used herein.
Figure 5B:
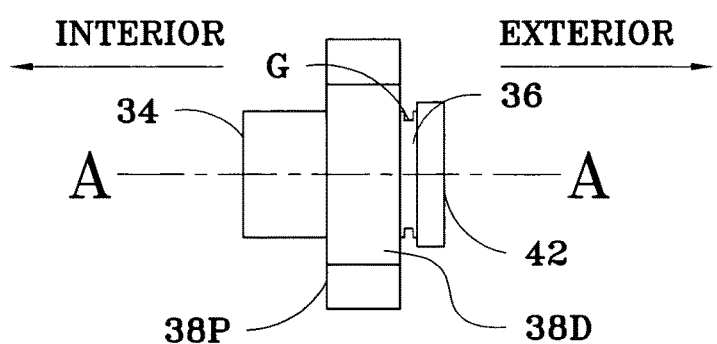
FIG. 5B is a cross sectional view thereof taken along line 5B of FIG. 5A and illustrating the meaning of "interior" and "exterior" as used herein.

As used herein, a first component of the device 100, 200 is "below" a second component of said device if, and only if, having reference to FIG. 5A, the first component is disposed lower than the second component. All components of the device 100, 200 preferably comprise steel, but may comprise any substances having sufficient strength, hardness, and durability to adequately perform the functions required of those components by the invention.

Although specific embodiments of the invention have been illustrated and described herein, it will be appreciated by those of ordinary skill in the art that modifications and changes in the devices 100, 200 set forth above will be possible without departing from the spirit and scope of the invention. Accordingly, it is intended that the following claims be interpreted to embrace all such modifications and changes, and equivalents thereof, as will be apparent to one having ordinary skill in this technology.

I claim:

1. A chain saw including
    a chain bar mount, said chain bar mount comprising a proximal ring and a distal base, said chain bar mount having an interior surface and an opposite, exterior surface;
    a motor assembly attached to the interior surface of the proximal ring, said motor assembly including a motor drive shaft that extends exteriorly through the proximal ring;
    a drive sprocket in driven engagement with the motor drive shaft for rotation therewith about the drive shaft axis whenever the motor is energized, said drive sprocket protruding exteriorly from the proximal ring;
    a chain guide bar that extends from a proximal end portion to an opposite, distal end portion in a direction normal to the motor drive shaft axis, the proximal end portion being attached to the exterior surface of the base of the chain bar mount, said chain guide bar having a straight, upper edge and an opposite, straight, bottom edge joined by a curved, distal edge and having a peripheral groove that extends continuously along said edges;
    a saw chain tensioner disposed distal to the drive sprocket and attached to an exterior surface of the proximal end portion of the chain guide bar and to the base of the chain bar mount by fasteners, said tensioner including means for moving the chain guide bar proximally and distally with respect to the chain bar mount;
    a closed-loop, cutting chain looped around the drive sprocket and the peripheral groove of the chain guide bar, and
    a chain containment device comprising:
    deflector means for deflecting, during operation of the chain saw, a detached or broken cutting chain exteriorly away from the drive sprocket to thereby deenergize the cutting chain;
        wherein said deflector means includes
            ramp means disposed below the bottom edge of the chain guide bar and below the chain saw tensioner, said ramp means having a distal end that is relatively far from the drive sprocket and an opposite, proximal end that is relatively near to the drive sprocket and having an exterior surface that obliquely crosses a plane that contains the exterior surface of the chain guide bar and extends proximally, progressively, and exteriorly toward said proximal end from slightly interior to exterior said plane; and means for attaching the ramp means to the chain saw; and chain catcher means for catching and arresting a detached cutting chain after it has been deflected exteriorly away from the drive sprocket, wherein said chain catcher means is attached to the chain saw, spaced exteriorly from the proximal ring of the chain bar mount, and at least partially surrounding the drive shaft axis;

whereby, whenever the motor assembly is energized, the cutting chain moves proximally through said peripheral groove along the bottom edge of the chain guide bar past the ramp means and toward the drive sprocket.

2. The chain saw of claim 1, wherein the means for attaching the ramp means to the chain saw includes a first face plate, said plate being shaped and dimensioned for attachment by fasteners to an exterior surface of the saw chain tensioner; and a semiannular arm that extends from a first, upper end attached to a proximal end of the first face plate to a second, lower, free end, said semiannular arm being shaped, dimensioned and disposed in coaxial, surrounding engagement of the proximal ring of the chain bar mount; and wherein the distal end of the ramp means comprises a ramp extension that extends distally from the second, free end of the semiannular arm below the bottom edge of the chain guide bar and below the chain saw tensioner.

3. The chain saw of claim 2, wherein the entrance surface is at a distal end of the ramp extension and disposed slightly interior to a plane that contains the interior surface of the chain guide bar and the exit surface is disposed exterior to a plane that contains the exterior surface of the chain guide bar at a proximal end of the ramp extension.

4. The chain saw of claim 3, wherein the chain catcher means includes a flange at a proximal end of the first face plate that protrudes exteriorly from the first face plate and extends from an upper edge to a lower edge thereof.

5. The chain saw of claim 1, wherein the ramp means includes a horseshoe-shaped arm, said arm having a bight portion shaped and dimensioned for coaxial, surrounding engagement of the ring of the chain bar mount; and a ramp that extends proximally from a lower, distal end portion of the horseshoe-shaped arm below the chain guide bar; and the means for attaching the ramp means to the chain saw includes a weld between a lower portion of the proximal ring of the bar mount and the horseshoe-shaped arm.

6. The chain saw of claim 5, wherein the ramp includes an entrance surface at a distal end thereof, which entrance surface is disposed slightly Interior to the plane that contains the interior surface of the chain guide bar; and an exit surface at a proximal end thereof, which exit surface is disposed at a distance sufficiently exterior to the plane that contains the exterior surface of the chain guard that is will deflect a detached chain, or any portion thereof, that engages the exit surface during operation of the chain saw, off the drive sprocket.

7. The chain saw of claim 6, wherein said chain catcher means includes a guard that is semiannular in exterior elevational view and is exteriorly spaced apart from the drive sprocket; and a chain catcher mounting plate that is shaped and dimensioned for close-fitting attachment by fasteners to an exterior surface of the saw chain tensioner, a proximal end of said plate being attached to the distal ends of said guard ring and said plate being coplanar with said guard.

8. The chain saw of claim 7, wherein said guard is coaxial with the drive sprocket.

9. The chain saw of claim 8, wherein said guard has an outer radius greater that the outer radius of the drive sprocket, but less than the outer radius of the proximal ring of the bar mount.

10. The chain saw of claim 9, wherein said guard includes a semitoroidal bight portion.

11. A method for deflecting a detached chain saw cutting chain from the chain saw drive sprocket during operation of the chain saw, said chain saw including:

providing the chainsaw of claim 1;

when said cutting chain detaches from the guide bar during operation, deflecting said cutting chain with said ramp and arresting said cutting chain with the chain catcher means.

12. The method of claim 11, wherein the distance between the plane and the distal end of the ramp means is in the range 1 cm to 3 cm.

13. The method of claim 11, further including the step of attaching the chain catcher means, and includes providing a first face plate to an exterior surface of the saw chain tensioner, and wherein the chain catcher means includes a flange at a proximal end of the first face plate that protrudes exteriorly from the first face plate and extends from an upper edge to a lower edge thereof.

14. The method of claim 11, wherein said chain catcher means includes a guard that is semiannular in exterior elevational view and is exteriorly spaced apart from the drive sprocket; and a chain catcher mounting plate that is shaped and dimensioned for close-fitting attachment by fasteners to an exterior surface of the saw chain tensioner, a proximal end of said plate being attached to the distal ends of said guard and said plate being coplanar with said guard.

15. The method of claim 14, wherein said guard is coaxial with the drive sprocket.

16. The method of claim 15, wherein said guard has an outer radius greater that the outer radius of the drive sprocket, but less than the outer radius of the proximal ring of the bar mount.

17. The method of claim 16, wherein said guard includes a semitoroidal bight portion.

18. The method of claim 11, further including the steps of removing the original equipment chain guard and chain catcher.

* * * * *